(12) United States Patent
Zheng et al.

(10) Patent No.: US 11,256,900 B1
(45) Date of Patent: Feb. 22, 2022

(54) FACIAL RECOGNITION METHODS AND APPARATUSES

(71) Applicant: ALIPAY (HANGZHOU) INFORMATION TECHNOLOGY CO., LTD., Zhejiang (CN)

(72) Inventors: Longfei Zheng, Hangzhou (CN); Chaochao Chen, Hangzhou (CN); Li Wang, Hangzhou (CN); Jun Zhou, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/360,462

(22) Filed: Jun. 28, 2021

(30) Foreign Application Priority Data

Aug. 14, 2020 (CN) .......................... 202010820141.3

(51) Int. Cl.
G06K 9/00 (2006.01)
H04L 9/00 (2006.01)
G06N 3/02 (2006.01)

(52) U.S. Cl.
CPC ..... *G06K 9/00228* (2013.01); *G06K 9/00268* (2013.01); *H04L 9/008* (2013.01); *G06N 3/02* (2013.01)

(58) Field of Classification Search
None
See application file for complete search history.

(56) References Cited

U.S. PATENT DOCUMENTS

2019/0095705 A1 3/2019 Yu et al.
2019/0205568 A1* 7/2019 Veugen .................. G06F 7/723
(Continued)

FOREIGN PATENT DOCUMENTS

CN 101808089 8/2010
CN 104821942 8/2015
(Continued)

OTHER PUBLICATIONS

Chen et al., "Lightweight Privacy-Preserving Training and Evaluation for Discretized Neural Networks," Apr. 2020, IEEE Internet of Things Journal, vol. 7, No. 4, pp. 2663-2678.
(Continued)

*Primary Examiner* — Bernard Krasnic
(74) *Attorney, Agent, or Firm* — Fish & Richardson P.C.

(57) ABSTRACT

Methods, systems, and apparatus for facial recognition. An example method includes storing encrypted facial features of a target user that are encrypted by using a first public key; receiving a recognition request from an end-user device of the target user, wherein the recognition request comprises an encrypted facial image and a second public key; performing homomorphic feature processing on the encrypted facial image; obtain obfuscated and encrypted output features; obtain obfuscated and encrypted facial features; transmitting the obfuscated and encrypted output features and the obfuscated and encrypted facial features to the end-user device; receiving from the end-user device a difference between the second intermediate value and the first intermediate value; and determining whether the to-be-recognized facial image corresponds to a facial image of the target user, comprising removing an impact of the first obfuscation and the second obfuscation on the difference.

20 Claims, 4 Drawing Sheets

(56) References Cited

U.S. PATENT DOCUMENTS

2020/0228340 A1* 7/2020 Blackhurst .......... H04L 63/0861
2020/0358611 A1* 11/2020 Hoang ................ H04L 63/0428

FOREIGN PATENT DOCUMENTS

| | | |
|---|---|---|
| CN | 109145829 | 1/2019 |
| CN | 110392027 | 10/2019 |
| CN | 111125735 | 5/2020 |
| CN | 111431713 | 7/2020 |
| CN | 111444545 | 7/2020 |
| KR | 102041906 | 11/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Ma et al., "A Secure Face-Verification Scheme Based on Homomorphic Encryption and Deep Neural Networks," Aug. 2017, IEEE Access, 5: 16532-16538.

Ma, "Research on the Key Technologies of Secure Identity Verification Based on Face Biometrics," Beijing Industry University, Oct. 2018, 122 pages (with English abstract).

Nakamoto, "Bitcoin: A Peer-to-Peer Electronic Cash System," www.bitcoin.org, 2005, 9 pages.

* cited by examiner

FACIAL RECOGNITION METHODS AND APPARATUSES

CROSS-REFERENCE TO RELATED APPLICATIONS

This application claims priority to Chinese Patent Application No. 202010820141.3, filed on Aug. 14, 2020, which is hereby incorporated by reference in its entirety.

TECHNICAL FIELD

One or more embodiments of the present specification relate to the field of computers, and in particular, to facial recognition methods and apparatuses.

BACKGROUND

With the development of artificial intelligence and computer vision technologies, as a quick and convenient new authentication method, facial recognition technologies has been widely used in many fields, such as face-scanning payments in financial transactions, face-scanning authentication in civil aviations, face-scanning access control in offices, face-scanning authentication in hotel accommodations, etc. Compared with the traditional identity authentication methods based on card swiping or passwords, facial recognition has the advantages of non-contact, fastness, effectiveness and anti-forge, so the facial recognition has gradually become the mainstream way for identity authentication.

Facial recognition technologies based on a server or cloud computing require users to upload local facial data to a remote computing platform, leading to inevitable leakage of the facial data to server providers. In addition, the biometric features of human faces are unique, and difficult to change once the biometric features of human faces are leaked; therefore, it is particularly important to protect data privacy and encrypt data. The current facial recognition methods still have a high risk of data leakage caused by attack, low security, and a low response speed.

Therefore, improved solutions are desired to improve the security and response speed of the facial recognition.

SUMMARY

One or more embodiments of the present specification describe facial recognition methods and apparatuses capable of improving the security and response speed of facial recognition.

In a first aspect, a facial recognition method is provided. The method is implemented by an end-user device, the end-user device performs identity registration on a target user in a server in advance so that the server stores encrypted facial features of the target user, the encrypted facial features are encrypted by using a first public key, and the method includes the following: obtaining a to-be-recognized facial image of the target user; performing homomorphic encryption on the to-be-recognized facial image by using a second public key to obtain an encrypted facial image; transmitting a recognition request to the server, wherein the recognition request comprises the encrypted facial image and the second public key, so that the server performs homomorphic feature processing on the encrypted facial image and adds first obfuscation to the encrypted facial image in a homomorphic way to obtain obfuscated and encrypted output features, and adds second obfuscation to the encrypted facial features in the homomorphic way to obtain obfuscated and encrypted facial features; the obfuscated and encrypted output features and the obfuscated and encrypted facial features are received from the server; decrypting the obfuscated and encrypted facial features by using a first private key corresponding to the first public key to obtain a first intermediate value; decrypting the obfuscated and encrypted output features by using a second private key corresponding to the second public key to obtain a second intermediate value; and calculating a difference between the second intermediate value and the first intermediate value; and transmitting the difference to the server so that the server removes the impact of the first obfuscation and the second obfuscation on the difference and then determines whether the to-be-recognized facial image corresponds to the target user.

In some possible implementations, the identity registration is performed in the following way: collecting at least one registered facial image and performing homomorphic encryption on the at least one registered facial image by using the first public key to obtain an encrypted and registered facial image; transmitting the encrypted and registered facial image and the first public key to the server so that the server performs homomorphic feature processing on the encrypted and registered facial image so as to obtain the encrypted facial features of the target user; and storing the first private key corresponding to the first public key.

In some possible implementations, the recognition request further includes a user identifier of the target user so that the server obtains the encrypted facial features of the target user from pre-stored encrypted facial features of a plurality of users based on the user identifier of the target user.

In a second aspect, a facial recognition method is provided. The method is implemented by a server, the server accepts identity registration performed by an end-user device on a target user in advance, and the server stores the encrypted facial features of the target user, the encrypted facial features are encrypted by using a first public key, and the method includes the following: receiving a recognition request from the end-user device, wherein the recognition request comprises an encrypted facial image and a second public key; and the encrypted facial image is obtained by performing homomorphic encryption on a to-be-recognized facial image of the target user by the end-user device with the second public key; performing homomorphic feature processing on the encrypted facial image and adding first obfuscation to the encrypted facial image in a homomorphic way to obtain obfuscated and encrypted output features, and adding second obfuscation to the encrypted facial features in the homomorphic way to obtain obfuscated and encrypted facial features; transmitting the obfuscated and encrypted output features and the obfuscated and encrypted facial features to the end-user device so that the end-user device decrypts the obfuscated and encrypted facial features by using a first private key corresponding to the first public key to obtain a first intermediate value, decrypts the obfuscated and encrypted output features by using a second private key corresponding to the second public key to obtain a second intermediate value, and calculates a difference between the second intermediate value and the first intermediate value; receiving the difference from the end-user device; and removing the impact of the first obfuscation and the second obfuscation on the difference so as to determine whether the to-be-recognized facial image corresponds to the target user.

In some possible implementations, the identity registration is performed in the following way: receiving an encrypted and registered facial image and the first public key from the end-user device, wherein the encrypted and registered facial image is obtained by performing homomorphic encryption on at least one registered facial image that is collected by the end-user device by using the first public key; and performing homomorphic feature processing on the encrypted and registered facial image to obtain the encrypted facial features of the target user.

In some possible implementations, the recognition request further includes a user identifier of the target user; and the method further includes the following: obtaining the encrypted facial features of the target user from pre-stored encrypted facial features of a plurality of users based on the user identifier of the target user.

In some possible implementations, the homomorphic feature processing includes: performing feature processing by using a facial recognition model suitable for a homomorphic operation.

In some possible implementations, the performing homomorphic feature processing on the encrypted facial image and adding first obfuscation to the encrypted facial image in a homomorphic way to obtain obfuscated and encrypted output features includes: performing homomorphic feature processing on the encrypted facial image to obtain encrypted output features; and adding first encrypted random features to the encrypted output features to obtain the obfuscated and encrypted output features, wherein first encrypted random features are obtained by performing homomorphic encryption on first initial random features by using the second public key.

Further, the removing impact of the first obfuscation and the second obfuscation on the difference includes: adding the first initial random features to the difference to remove the impact of the first obfuscation.

In some possible implementations, the adding second obfuscation in the homomorphic way to the encrypted facial features to obtain obfuscated and encrypted facial features includes: adding second encrypted random features to the encrypted facial features to obtain the obfuscated and encrypted facial features, wherein the second encrypted random features are obtained by performing homomorphic encryption on second initial random features by using the first public key.

Further, the removing impact of the first obfuscation and the second obfuscation on the difference includes: subtracting the second initial random features from the difference to remove the impact of the second obfuscation.

In a third aspect, a facial recognition apparatus is provided. The apparatus is disposed in an end-user device, the end-user device performs identity registration on a target user in a server in advance so that the server stores encrypted facial features of the target user, the encrypted facial features are encrypted by using a first public key, and the apparatus includes: an acquisition unit, configured to obtain a to-be-recognized facial image of the target user; an encryption unit, configured to perform homomorphic encryption on the to-be-recognized facial image obtained by the acquisition unit by using a second public key to obtain an encrypted facial image; a transmitting unit, configured to transmit a recognition request to the server, wherein the recognition request comprises the encrypted facial image obtained by the encryption unit and the second public key, so that the server performs homomorphic feature processing on the encrypted facial image and adds first obfuscation to the encrypted facial image in a homomorphic way to obtain obfuscated and encrypted output features, and adds second obfuscation to the encrypted facial features in the homomorphic way to obtain obfuscated and encrypted facial features; a receiving unit, configured to receive the obfuscated and encrypted output features and the obfuscated and encrypted facial features from the server; and a decryption and calculation unit, configured to decrypt the obfuscated and encrypted facial features received by the receiving unit by using a first private key corresponding to the first public key to obtain a first intermediate value; decrypt the obfuscated and encrypted output features received by the receiving unit by using a second private key corresponding to the second public key to obtain a second intermediate value; and calculate a difference between the second intermediate value and the first intermediate value, wherein the transmitting unit is further configured to transmit the difference obtained by the decryption and calculation unit to the server so that the server removes impact of the first obfuscation and the second obfuscation on the difference, and determines whether the to-be-recognized facial image corresponds to the target user.

In a fourth aspect, a facial recognition apparatus is provided. The apparatus is disposed in a server, the server accepts identity registration performed by the end-user device on a target user in advance, the server stores encrypted facial features of the target user, the encrypted facial features are encrypted by using a first public key, and the apparatus includes: a receiving unit, configured to receive a recognition request from the end-user device, wherein the recognition request comprises an encrypted facial image and a second public key, and the encrypted facial image is obtained by performing homomorphic encryption on a to-be-recognized facial image of the target user by the end-user device by using the second public key; an obfuscation processing unit, configured to perform homomorphic feature processing on the encrypted facial image received by the receiving unit, add first obfuscation to the encrypted facial image in a homomorphic way to obtain obfuscated and encrypted output features, and add second obfuscation to the encrypted facial features in the homomorphic way to obtain obfuscated and encrypted facial features; a transmitting unit, configured to transmit the obfuscated and encrypted output features and the obfuscated and encrypted facial features obtained by the obfuscation processing unit to the end-user device so that the end-user device decrypts the obfuscated and encrypted facial features by using a first private key corresponding to the first public key to obtain a first intermediate value; decrypts the obfuscated and encrypted output features by using a second private key corresponding to the second public key to obtain a second intermediate value, and calculates a difference between the second intermediate value and the first intermediate value, wherein the receiving unit is further configured to receive the difference from the end-user device; and a recognition unit, configured to remove impact of the first obfuscation and the second obfuscation on the difference received by the receiving unit so as to determine whether the to-be-recognized facial image corresponds to the target user.

In a fifth aspect, a computer-readable storage medium is provided. The computer-readable storage medium stores a computer program that, when executed by a computer, enables the computer to perform the methods provided in the first or the second aspect.

In a sixth aspect, a computing device is provided. The computing device includes a memory and a processor, the memory stores executable code, and when executing the executable code, the processor implements the methods provided in the first or the second aspect.

According to the methods and apparatuses provided in the embodiments of the present specification, the end-user device performs identity registration on the target user in the server in advance so that the server stores the encrypted facial features of the target user, the encrypted facial features are encrypted by using the first public key, and subsequently when performing the facial recognition, the end-user device first obtains the to-be-recognized facial image of the target user, and then the end-user device performs homomorphic encryption on the to-be-recognized facial image by using the second public key to obtain the encrypted facial image, wherein the second public key is different from the first public key, so that the privacy protection capability is improved. The end-user device transmits the recognition request to the server, wherein the recognition request includes the encrypted facial image and the second public key so that the server performs homomorphic feature processing on the encrypted facial image and adds the first obfuscation in the homomorphic way to obtain the obfuscated and encrypted output features, and adds the second obfuscation to the encrypted facial features in the homomorphic way to obtain the obfuscated and encrypted facial features. The end-user device receives the obfuscated and encrypted output features and the obfuscated and encrypted facial features from the server. Since the end-user device cannot obtain the plain text facial feature template, the false authentication of the end-user device is prevented and the security of authentication is improved. Subsequently, the end-user device decrypts the obfuscated and encrypted facial features by using the first private key corresponding to the first public key to obtain the first intermediate value, decrypts the obfuscated and encrypted output features by using the second private key corresponding to the second public key to obtain the second intermediate value, and calculates the difference between the second intermediate value and the first intermediate value. Finally, the end-user device transmits the difference to the server so that the server removes the impact of the first obfuscation and the second obfuscation on the difference, and determines whether the to-be-recognized facial image corresponds to the target user. The response speed of the facial recognition is improved because there is no need to calculate the cipher text distance. In summary, the security and response speed of the facial recognition can be improved.

BRIEF DESCRIPTION OF DRAWINGS

In order to describe the technical solutions of the embodiments of the present specification more clearly, the drawings required to be used in the embodiments of the present specification will be simply introduced below. Clearly, the drawings described below are only some embodiments of the present specification. Other drawings may further be obtained by those skilled in the art according to these drawings without creative work.

DETAILED DESCRIPTION OF EMBODIMENTS

The solutions provided in the present specification will now be described with reference to the accompanying drawings.

Figure 1:
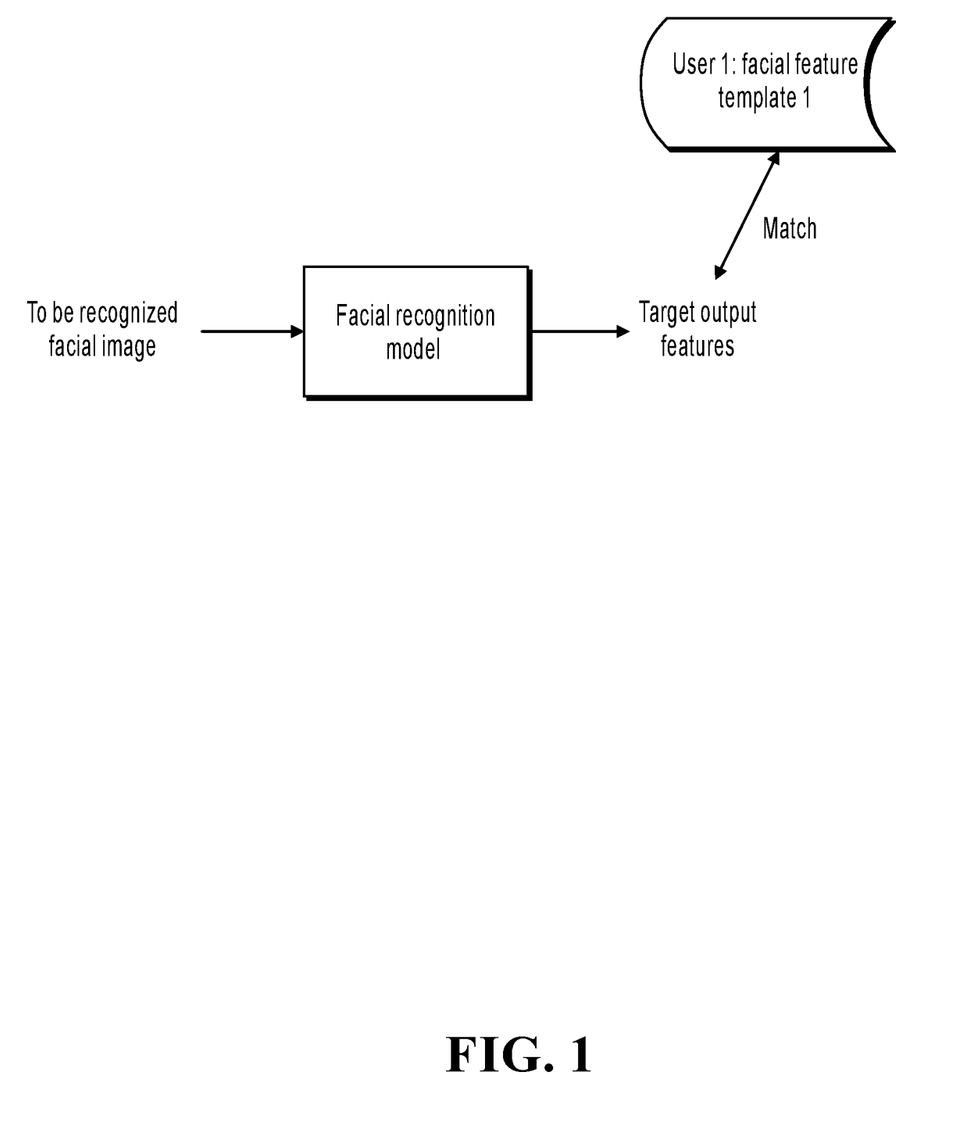
FIG. 1 is a schematic diagram illustrating implementation of some embodiments disclosed in the present specification.

FIG. 1 is a schematic diagram illustrating implementation of some embodiments disclosed in the present specification. The implementation relates to facial recognition. Referring to FIG. 1, when the facial recognition is performed, a to-be-recognized facial image is input into a facial recognition model to obtain target output features, the target output features are compared against a facial feature template, that is, a similarity score, which means the possibility that the target output features and the facial feature template belong to the same subject, between the target output features and the facial feature template is determined, and then a user identity corresponding to the to-be-recognized facial image is further determined. It can be understood that a process of facial image registration is also included prior to the facial recognition. The facial image registration means that a facial image of a user with known identity is converted to a compact and discriminable feature vector through the facial recognition model, wherein the feature vector is also referred to the facial feature template.

Generally, both the facial recognition and the facial image registration processes involve the interaction between an end-user device and a server. Taking the facial recognition process as an example, the end-user device collects the facial image by using a camera; the facial image collected is then transmitted to the server; and the server obtains the target output features by using the facial recognition model, and then determines the user identity corresponding to the facial image based on the target output features.

The facial image belongs to user privacy, and the facial image should be protected from leakage to improve the security and response speed of the facial recognition.

In some examples, the facial recognition model is a convolutional neural network (CNN) that is a multi-layer artificial neural network specially designed for processing two-dimensional input data, each layer in the network is composed of a plurality of two-dimensional layers, each layer is composed of a plurality of independent neurons, the neurons on two adjacent layers are interconnected, and neurons on the same layer are not connected. The basic structure of the CNN can include one or more of an input layer, a convolution layer, a pooling layer, a fully connected layer, and an output layer. Generally, a plurality of convolution layers and a plurality of pooling layers are arranged alternately, that is, one convolution layer is connected to one pooling layer, the pooling layer is then connected to another convolution layer, and the rest can be done in the same way.

It is worthwhile to note that a specific network structure of the facial recognition model is not limited in the embodiments of the present specification, and the above examples are only for the convenience of understanding.

Figure 2:
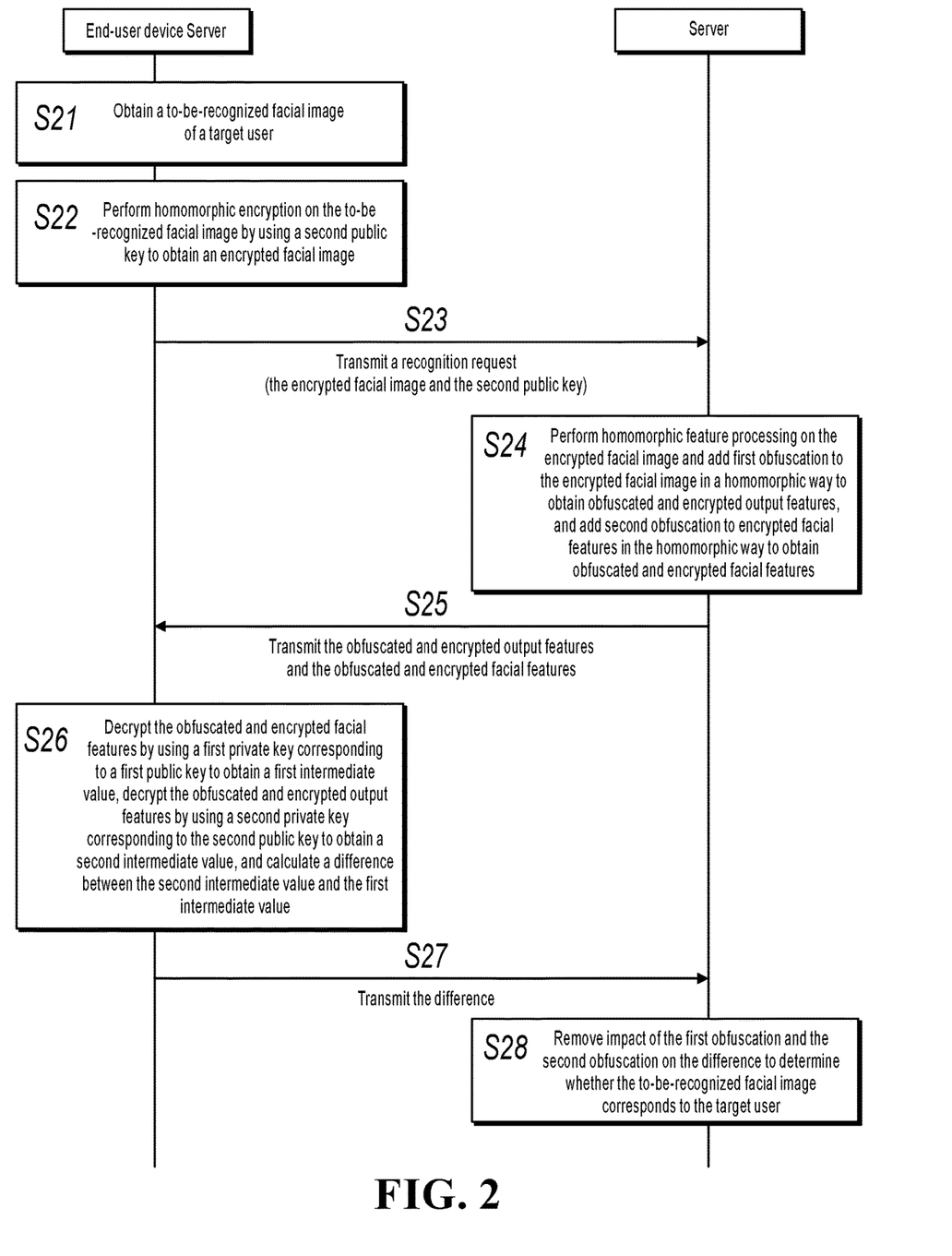
FIG. 2 is a flowchart illustrating a facial recognition method, according to some embodiments.

FIG. 2 is a flowchart of a facial recognition method, according to some embodiments. The method is performed by interaction between an end-user device and a server, the end-user device performs identity registration on a target user in the server in advance so that the server stores encrypted facial features of the target user, the encrypted facial features are encrypted by using a first public key, and the method can be based on the implementation scenario shown in FIG. 1. As shown in FIG. 2, the facial recognition method in the embodiment includes the following steps.

Step 21: The end-user device obtains a to-be-recognized facial image of the target user. It can be understood that a user identifier of the target user is to be recognized, the server stores a facial feature template of the target user, and the previously described encrypted facial features are the facial feature template in cipher text.

In some embodiments of the present specification, the user can register a facial image through the end-user device, and then perform the facial recognition through the end-user device.

In some examples, the end-user device collects facial information by using a camera to obtain the facial image, detects and aligns the facial image, and performs data preprocessing to obtain the to-be-recognized facial image.

Then in step 22 the end-user device performs homomorphic encryption on the to-be-recognized facial image by using a second public key to obtain an encrypted facial image. It can be understood that the end-user device also has a second private key corresponding to the second public key, and the second public key and the second private key form one key pair.

In some examples, before step 22, the end-user device can generate the key pair composed of the second public key and the second private key.

The second public key is different from the first public key so that the privacy protection capability is improved.

Then in step 23 the end-user device transmits a recognition request to the server, wherein the recognition request includes the encrypted facial image and the second public key. It can be understood that the end-user device retains the second private key corresponding to the second public key.

Accordingly, the server receives the recognition request from the end-user device, wherein the recognition request includes the encrypted facial image and the second public key.

In some examples, the recognition request further includes the user identifier of the target user; and the method further includes the following: the server obtains the encrypted facial features of the target user from pre-stored encrypted facial features of a plurality of users based on the user identifier of the target user.

Then in step 24 the server performs homomorphic feature processing on the encrypted facial image and adds first obfuscation to the encrypted facial image in a homomorphic way to obtain obfuscated and encrypted output features, and adds second obfuscation to the encrypted facial features in the homomorphic way to obtain obfuscated and encrypted facial features. It can be understood that homomorphic feature processing has been performed on the encrypted facial features during the facial image registration.

In some examples, the homomorphic feature processing includes:

performing feature processing by using a facial recognition model suitable for a homomorphic operation.

In some examples, the performing homomorphic feature processing to the encrypted facial image and adding first obfuscation to the encrypted facial image in a homomorphic way to obtain obfuscated and encrypted output features includes:

performing homomorphic feature processing on the encrypted facial image to obtain encrypted output features; and adding first encrypted random features to the encrypted output features to obtain the obfuscated and encrypted output features, wherein the first encrypted random features are obtained by performing homomorphic encryption on first initial random features by using the second public key.

In some examples, the adding second obfuscation to the encrypted facial features to obtain obfuscated and encrypted facial features in the homomorphic way includes:

adding second encrypted random features to the encrypted facial features to obtain the obfuscated and encrypted facial features, wherein the second encrypted random features are obtained by performing homomorphic encryption on second initial random features by using the first public key.

Then in step 25 the server transmits the obfuscated and encrypted output features and the obfuscated and encrypted facial features to the end-user device. It can be understood that since the end-user device cannot obtain the facial feature template in plain text, the false authentication of the end-user device is prevented and the security of the authentication is improved.

Accordingly, the end-user device receives the obfuscated and encrypted output features and the obfuscated and encrypted facial features from the server.

Then in step 26 the end-user device decrypts the obfuscated and encrypted facial features by using a first private key corresponding to the first public key to obtain a first intermediate value, decrypts the obfuscated and encrypted output features by using the second private key corresponding to the second public key to obtain a second intermediate value, and calculates a difference between the second intermediate value and the first intermediate value. It can be understood that the response speed of facial recognition is improved because there is no need to calculate the cipher text distance.

Then in step 27 the end-user device transmits the difference to the server. Accordingly, the server receives the difference from the end-user device.

Lastly in step 28 the server removes impact of the first obfuscation and the second obfuscation on the difference, and determines whether the to-be-recognized facial image corresponds to the target user. It can be understood that the server can obtain the distance or the similarity score between the to-be-recognized facial image and the target user after removing the impact of the first obfuscation and the second obfuscation on the difference so as to determine whether the to-be-recognized facial image corresponds to the target user.

In some examples, the removing impact of the first obfuscation and the second obfuscation on the difference includes:

adding the first initial random features to the difference to remove the impact of the first obfuscation.

In some examples, the removing impact of the first obfuscation and the second obfuscation on the difference includes:

subtracting the second initial random features from the difference to remove the impact of the second obfuscation.

In some examples, the identity registration is performed in the following way: The end-user device collects at least one registered facial image, and performs homomorphic encryption by using the first public key to obtain an encrypted and registered facial image. The end-user device transmits the encrypted and registered facial image and the first public key to the server so that the server can perform homomorphic feature processing on the encrypted and registered facial image to obtain the encrypted facial features of the target user. The end-user device stores the first private key corresponding to the first public key.

For example, the facial image registration is performed before the facial recognition, and the specific process is as follows:

Facial image registration: To locally register the end-user device, a plurality of facial images I1 are collected from different angles, <I1>1 is obtained by performing homomorphic encryption on collected facial images I1 by using first public key pk1 and is uploaded to the server, and the first public key and the corresponding first private key (pk1 and sk1) are stored. The server uses the plurality of images <I1>1 of a single user that are obtained through homomorphic encryption and the facial recognition model of the server to obtain encrypted facial features <X1>1.

Facial recognition: To perform facial recognition, a mobile phone generates a new homomorphic key that includes second public key pk2 and second private key sk2, facial images I2 to be recognized are encrypted by using second public key pk2 to obtain <I2>2, <I2>2 and a user identity (ID) are uploaded to the server together, and <I2>2 is input into the facial recognition model to obtain <X2>2. The server obtains corresponding encrypted facial features <X1>1 based on the user ID, generates random matrices mask1 and mask2 based on the vector dimension of the encrypted facial features, and obtains <X1+mask1>1 and <X2+mask2>2 by using the previously described random matrices to perform obfuscation processing, wherein <X1+mask1>1 is encrypted by using the first public key, <X2+mask2>2 is encrypted by using the second public key, the server returns <X1+mask1>1 and <X2+mask2>2 to the end-user device, and the end-user device decrypts <X1+mask1>1 and <X2+mask2>2 to obtain X1+mask1 and X2+mask2, calculates a difference D mask=X1+mask1−(X2+mask2), and returns the difference Dmask to the server. The server obtains D=X1−X2 after the obfuscation is removed, and then obtains the similarity score ‖D‖2 between the to-be-recognized facial image and the target user.

According to the methods provided in the embodiments of the present specification, the end-user device performs identity registration on the target user in the server in advance so that the server stores the encrypted facial features of the target user, the encrypted facial features are encrypted by using the first public key, and subsequently when performing the facial recognition, the end-user device first obtains the to-be-recognized facial image of the target user, and then the end-user device performs homomorphic encryption on the to-be-recognized facial image by using the second public key to obtain the encrypted facial image, wherein the second public key is different from the first public key, so that the privacy protection capability is improved. The end-user device transmits the recognition request to the server, wherein the recognition request includes the encrypted facial image and the second public key so that the server performs homomorphic feature processing on the encrypted facial image and adds the first obfuscation in the homomorphic way to obtain the obfuscated and encrypted output features, and adds the second obfuscation to the encrypted facial features in the homomorphic way to obtain the obfuscated and encrypted facial features. The end-user device receives the obfuscated and encrypted output features and the obfuscated and encrypted facial features from the server. Since the end-user device cannot obtain the plain text facial feature template, the false authentication of the end-user device is prevented and the security of authentication is improved. Subsequently, the end-user device decrypts the obfuscated and encrypted facial features by using the first private key corresponding to the first public key to obtain the first intermediate value, decrypts the obfuscated and encrypted output features by using the second private key corresponding to the second public key to obtain the second intermediate value, and calculates the difference between the second intermediate value and the first intermediate value. Finally, the end-user device transmits the difference to the server so that the server removes the impact of the first obfuscation and the second obfuscation on the difference, and determines whether the to-be-recognized facial image corresponds to the target user. The response speed of the facial recognition is improved because there is no need to calculate the cipher text distance. In summary, the security and response speed of the facial recognition can be improved.

Figure 3:
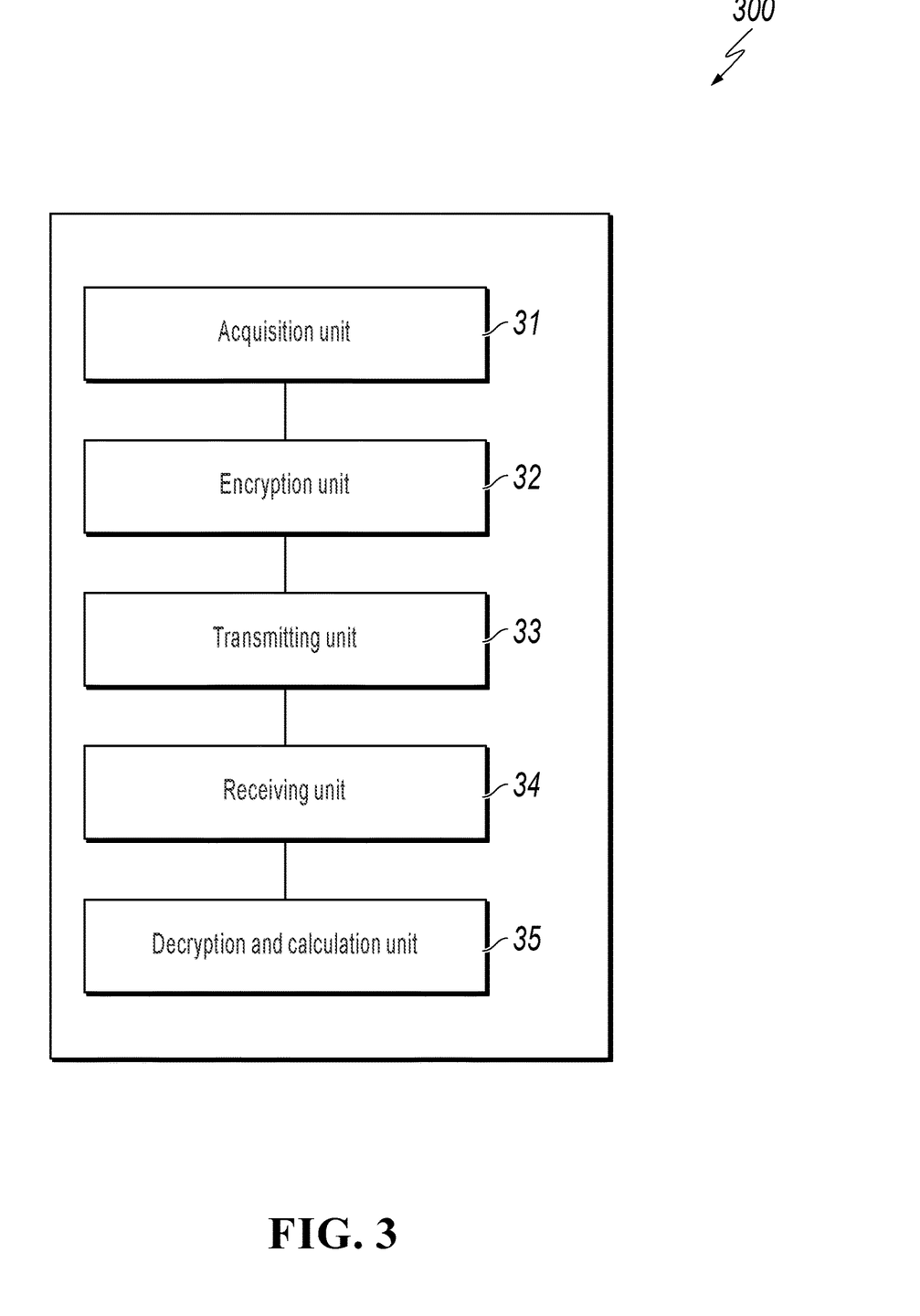
FIG. 3 is a schematic block diagram illustrating a facial recognition apparatus, according to some embodiments.

According to another aspect of the present invention, a facial recognition apparatus is also provided. The apparatus is disposed in an end-user device, the end-user device performs identity registration on a target user in a server in advance so that the server stores encrypted facial features of the target user, the encrypted facial features are encrypted by using a first public key, and the apparatus is used to perform actions performed by the end-user device in the facial recognition method provided in the embodiments of the present specification. FIG. 3 is a schematic block diagram illustrating a facial recognition apparatus, according to some embodiments. As shown in FIG. 3, the apparatus 300 includes:

an acquisition unit 31, configured to obtain a to-be-recognized facial image of the target user;

an encryption unit 32, configured to perform homomorphic encryption on the to-be-recognized facial image obtained by the acquisition unit 31 by using a second public key to obtain an encrypted facial image;

a transmitting unit 33, configured to transmit a recognition request to the server, wherein the recognition request includes the encrypted facial image obtained by the encryption unit 32 and the second public key, so that the server performs homomorphic feature processing on the encrypted facial image and adds first obfuscation to the encrypted facial image in a homomorphic way to obtain obfuscated and encrypted output features, and adds second obfuscation to the encrypted facial features in the homomorphic way to obtain obfuscation encrypted facial features;

a receiving unit 34, configured to receive the obfuscated and encrypted output features and the obfuscated and encrypted facial features from the server; and a decryption and calculation unit 35, configured to use the first private key corresponding to the first public key to decrypt the obfuscated and encrypted facial features received by the receiving unit 34 by using a first private key corresponding to the first public key to obtain a first intermediate value, decrypt the obfuscated and encrypted output features received by the receiving unit 34 by using a second private key corresponding to the second public key to obtain a second intermediate value, and calculate a difference between the second intermediate value and the first intermediate value, where the transmitting unit 33 is further configured to transmit the difference obtained by the decryption and calculation unit 35 to the server so that the server removes impact of the first obfuscation and the second obfuscation on the difference, and determines whether the to-be-recognized facial image corresponds to the target user.

Optionally, as some embodiments, the identity registration is performed in the following way:

collecting at least one registered facial image and performing homomorphic encryption on the at least one registered facial image by using the first public key to obtain an encrypted and registered facial image;

transmitting the encrypted and registered facial image and the first public key to the server so that the server performs homomorphic feature processing on the encrypted and registered facial image so as to obtain the encrypted facial features of the target user; and storing the first private key corresponding to the first public key.

Optionally, as some embodiments, the recognition request further includes a user identifier of the target user so that the server obtains the encrypted facial features of the target user from pre-stored encrypted facial features of a plurality of users based on the user identifier of the target user.

Figure 4:
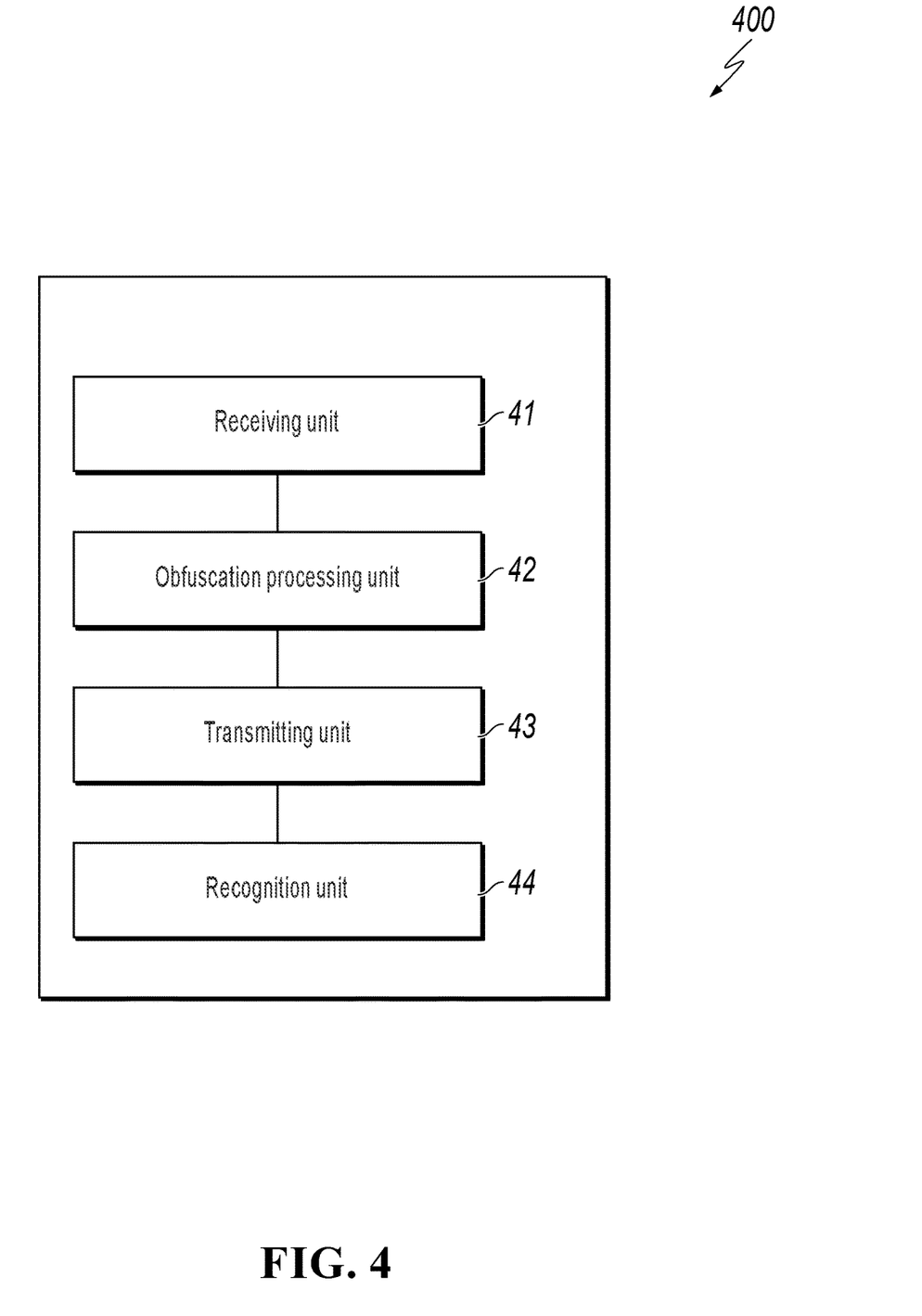
FIG. 4 is a schematic block diagram illustrating a facial recognition apparatus, according to other embodiments.

According to some embodiments of another aspect, a facial recognition apparatus is provided. The apparatus is disposed in a server, the server accepts identity registration performed by an end-user device on a target user in advance, the server stores encrypted facial features of the target user, the encrypted facial features are encrypted by using a first public key, and the apparatus is used to perform actions performed by the server in the facial recognition method provided in the embodiments of the present specification. FIG. 4 is a schematic block diagram illustrating a facial recognition apparatus, according to other embodiments. As shown in FIG. 4, the apparatus 400 includes:

a receiving unit 41, configured to receive a recognition request from the end-user device, wherein the recognition request includes an encrypted facial image and a second public key, and the encrypted facial image is obtained by performing homomorphic encryption on a to-be-recognized facial image of the target user by the end-user device by using the second public key;

an obfuscation processing unit 42, configured to perform homomorphic feature processing on the encrypted facial image received by the receiving unit 41, add first obfuscation to the encrypted facial image in a homomorphic way to obtain obfuscation encryption output features, and add second obfuscation to the encrypted facial features in the homomorphic way to obtain obfuscated and encrypted facial features;

a transmitting unit 43, configured to transmit the obfuscation encryption output features and the obfuscated and encrypted facial features obtained by the obfuscation processing unit 42 to the end-user device so that the end-user device decrypts the obfuscated and encrypted facial features by using a first private key corresponding to the first public key to obtain a first intermediate value, decrypts the obfuscated and encrypted output features by using a second private key corresponding to the second public key to obtain a second intermediate value, and calculates a difference between the second intermediate value and the first intermediate value, where the receiving unit 41 is further configured to receive the difference from the end-user device; and a recognition unit 44, configured to remove impact of the first obfuscation and the second obfuscation on the difference received by the receiving unit 41 so as to determine whether the to-be-recognized facial image corresponds to the target user.

Optionally, as some embodiments, the identity registration is performed in the following way:

receiving an encrypted and registered facial image and the first public key from the end-user device, wherein the encrypted and registered facial image is obtained by performing homomorphic encryption on at least one registered facial image that is collected by the end-user device by using the first public key; and performing homomorphic feature processing on the encrypted and registered facial image to obtain the encrypted facial features of the target user.

Optionally, as some embodiments, the recognition request further includes a user identifier of the target user; and the apparatus also includes:

a searching unit, configured to obtain the encrypted facial features of the target user from pre-stored encrypted facial features of a plurality of users based on the user identifier of the target user.

Optionally, as some embodiments, the homomorphic feature processing includes:

performing feature processing by using a facial recognition model suitable for a homomorphic operation.

Optionally, as some embodiments, the obfuscation processing unit 42 includes:

a feature extraction subunit, configured to perform homomorphic feature processing on the encrypted facial image to obtain encrypted output features; and a first obfuscation subunit, configured to add first encrypted random features to the encrypted output features obtained by the feature extraction subunit to obtain the obfuscated and encrypted output features, wherein the first encrypted random features are obtained by encrypting first initial random features in the homomorphic way by using the second public key.

Further, the recognition unit 44 is configured to add the first initial random features to the difference to remove the impact of the first obfuscation.

Optionally, as some embodiments, the obfuscation processing unit 42 includes:

a second obfuscation subunit, configured to add second encrypted random features to the encrypted facial features to obtain the obfuscated and encrypted facial features, wherein the second encrypted random features are obtained by encrypting second initial random features in the homomorphic way by using the first public key.

Further, the recognition unit 44 is configured to subtract the second initial random features from the difference to remove the impact of the second obfuscation.

According to the apparatus provided in some embodiments of the present specification, the end-user device performs identity registration on the target user in the server in advance so that the server stores the encrypted facial features of the target user, and the encrypted facial features are encrypted by using the first public key, and subsequently when performing the facial recognition, the end-user device first obtains the to-be-recognized facial image of the target user via the acquisition unit 31, and then, the encryption unit 32 performs homomorphic encryption on the to-be-recognized facial image by using the second public key to obtain the encrypted facial image, wherein the second public key is different from the first public key, so that the privacy protection capability is improved. The transmitting unit 33 transmits the recognition request to the server, wherein the recognition request includes the encrypted facial image and the second public key, so that the obfuscation processing unit 42 of the server performs homomorphic feature processing on the encrypted facial image and adds the first obfuscation to the encrypted facial image in the homomorphic way to obtain the obfuscated and encrypted output features, and adds the second obfuscation to the encrypted facial features in the homomorphic way to obtain the obfuscated and encrypted facial features. The receiving unit 34 receives the obfuscated and encrypted output features and the obfuscated and encrypted facial features from the server. Since the end-user device cannot obtain the plain text facial feature template, the false authentication of the end-user device is prevented and the security of authentication is improved. The decryption and calculation unit 35 then decrypts the obfuscated and encrypted facial features by using the first private key corresponding to the first public key to obtain the first intermediate value, decrypts the obfuscated and encrypted output features by using the second private key corresponding to the second public key to obtain the second intermediate value, and calculates the difference between the second intermediate value and the first intermediate value. Finally, the transmitting unit 33 transmits the difference to the server, so that the recognition unit 44 of the server removes the impact of the first obfuscation and the second obfuscation on the difference, and determines whether the to-be-recognized facial image corresponds to the target user. The response speed of the facial recognition is improved because there is no need to calculate the cipher text distance. In summary, the security and response speed of the facial recognition can be improved.

According to some embodiments of another aspect, a computer-readable storage medium is provided. The computer-readable storage medium stores a computer program that, when executed in a computer, enables the computer to perform the method described with reference to FIG. 2.

According to some embodiments of another aspect, a computing device is provided. The computing device includes a memory and a processor, the memory stores executable code, and when executing the executable code, the processor implements the method described with reference to FIG. 2.

A person skilled in the art should understand that, in one or more examples previously described, the functions described in the present specification can be implemented in hardware, software, firmware, or any combination of the hardware, the software and the firmware. When implemented in the software, the functions can be stored in the computer-readable medium or transmitted as one or more instructions or code on the computer-readable medium.

The specific implementations mentioned above have been further described in detail for illustrating the purposes, technical solutions, and beneficial effects of the present invention, it should be understood that the above-described specific implementations are merely illustrative of the present invention and are not to be construed as limiting the scope of the invention, and that various modifications, equivalents, improvements, etc. can be made without departing from the spirit and scope of the invention, all should fall within the scope of the present invention.

What is claimed is:

1. A computer-implemented method for facial recognition, wherein the method comprises:
    storing encrypted facial features of a target user that are encrypted by using a first public key;
    receiving a recognition request from an end-user device of the target user, wherein the recognition request comprises an encrypted facial image and a second public key, wherein the encrypted facial image is obtained by performing homomorphic encryption on a to-be-recognized facial image of the target user by the end-user device by using the second public key;
    performing homomorphic feature processing on the encrypted facial image;
    obtain obfuscated and encrypted output features, comprising homomorphically adding first obfuscation to the encrypted facial image;
    obtain obfuscated and encrypted facial features, comprising homomorphically adding second obfuscation to the encrypted facial features;
    transmitting the obfuscated and encrypted output features and the obfuscated and encrypted facial features to the end-user device;
    receiving from the end-user device a difference between a second intermediate value and a first intermediate value, wherein the difference is calculated by the end-user device based on:
        decrypting the obfuscated and encrypted facial features by using a first private key corresponding to the first public key to obtain the first intermediate value, and
        decrypting the obfuscated and encrypted output features by using a second private key corresponding to the second public key to obtain the second intermediate value; and
    determining whether the to-be-recognized facial image corresponds to a facial image of the target user, comprising removing an impact of the first obfuscation and the second obfuscation on the difference.

2. The computer-implemented method according to claim 1, further comprising:
    receiving an encrypted and registered facial image and the first public key from the end-user device, wherein the encrypted and registered facial image is obtained by performing homomorphic encryption on at least one registered facial image that is collected by the end-user device by using the first public key; and
    performing homomorphic feature processing on the encrypted and registered facial image to obtain the encrypted facial features of the target user.

3. The computer-implemented method according to claim 1, wherein the recognition request further comprises a user identifier of the target user, and the method further comprises:
    obtaining the encrypted facial features of the target user from pre-stored encrypted facial features of a plurality of users based on the user identifier of the target user.

4. The computer-implemented method according to claim 1, wherein the homomorphic feature processing comprises:
    performing feature processing by using a facial recognition model suitable for a homomorphic operation.

5. The computer-implemented method according to claim 1, wherein the performing the homomorphic feature processing on the encrypted facial image and homomorphically adding the first obfuscation to the encrypted facial image comprises:
    performing homomorphic feature processing on the encrypted facial image to obtain encrypted output features; and
    adding first encrypted random features to the encrypted output features to obtain the obfuscated and encrypted output features, wherein the first encrypted random features are obtained by performing homomorphic encryption on first initial random features by using the second public key.

6. The computer-implemented method according to claim 5, wherein removing the impact of the first obfuscation and the second obfuscation on the difference comprises:
    adding the first initial random features to the difference to remove the impact of the first obfuscation.

7. The computer-implemented method according to claim 5, wherein homomorphically adding the second obfuscation to the encrypted facial features comprises:
    adding second encrypted random features to the encrypted facial features to obtain the obfuscated and encrypted facial features, wherein the second encrypted random features are obtained by performing homomorphic encryption on second initial random features by using the first public key.

8. The computer-implemented method according to claim 7, wherein removing the impact of the first obfuscation and the second obfuscation on the difference comprises:
    subtracting the second initial random features from the difference to remove the impact of the second obfuscation.

9. A non-transitory computer-readable medium storing one or more instructions, executable by a computer system, perform operations for facial recognition, wherein the operations comprise:
storing encrypted facial features of a target user that are encrypted by using a first public key;
receiving a recognition request from an end-user device of the target user, wherein the recognition request comprises an encrypted facial image and a second public key, wherein the encrypted facial image is obtained by performing homomorphic encryption on a to-be-recognized facial image of the target user by the end-user device by using the second public key;
performing homomorphic feature processing on the encrypted facial image;
obtain obfuscated and encrypted output features, comprising homomorphically adding first obfuscation to the encrypted facial image;
obtain obfuscated and encrypted facial features, comprising homomorphically adding second obfuscation to the encrypted facial features;
transmitting the obfuscated and encrypted output features and the obfuscated and encrypted facial features to the end-user device;
receiving from the end-user device a difference between a second intermediate value and a first intermediate value, wherein the difference is calculated by the end-user device based on:
decrypting the obfuscated and encrypted facial features by using a first private key corresponding to the first public key to obtain the first intermediate value, and
decrypting the obfuscated and encrypted output features by using a second private key corresponding to the second public key to obtain the second intermediate value; and
determining whether the to-be-recognized facial image corresponds to a facial image of the target user, comprising removing an impact of the first obfuscation and the second obfuscation on the difference.

10. The non-transitory computer-readable medium according to claim 9, wherein the operations further comprise:
receiving an encrypted and registered facial image and the first public key from the end-user device, wherein the encrypted and registered facial image is obtained by performing homomorphic encryption on at least one registered facial image that is collected by the end-user device by using the first public key; and
performing homomorphic feature processing on the encrypted and registered facial image to obtain the encrypted facial features of the target user.

11. The non-transitory computer-readable medium according to claim 9, wherein the recognition request further comprises a user identifier of the target user, and the operations further comprise:
obtaining the encrypted facial features of the target user from pre-stored encrypted facial features of a plurality of users based on the user identifier of the target user.

12. The non-transitory computer-readable medium according to claim 9, wherein the homomorphic feature processing comprises:
performing feature processing by using a facial recognition model suitable for a homomorphic operation.

13. The non-transitory computer-readable medium according to claim 9, wherein the performing the homomorphic feature processing on the encrypted facial image and homomorphically adding the first obfuscation to the encrypted facial image comprises:
performing homomorphic feature processing on the encrypted facial image to obtain encrypted output features; and
adding first encrypted random features to the encrypted output features to obtain the obfuscated and encrypted output features, wherein the first encrypted random features are obtained by performing homomorphic encryption on first initial random features by using the second public key.

14. The non-transitory computer-readable medium according to claim 13, wherein removing the impact of the first obfuscation and the second obfuscation on the difference comprises:
adding the first initial random features to the difference to remove the impact of the first obfuscation.

15. The non-transitory computer-readable medium according to claim 14, wherein homomorphically adding the second obfuscation to the encrypted facial features comprises:
adding second encrypted random features to the encrypted facial features to obtain the obfuscated and encrypted facial features, wherein the second encrypted random features are obtained by performing homomorphic encryption on second initial random features by using the first public key.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform operations for facial recognition, wherein the operations comprise:
storing encrypted facial features of a target user that are encrypted by using a first public key;
receiving a recognition request from an end-user device of the target user, wherein the recognition request comprises an encrypted facial image and a second public key, wherein the encrypted facial image is obtained by performing homomorphic encryption on a to-be-recognized facial image of the target user by the end-user device by using the second public key;
performing homomorphic feature processing on the encrypted facial image;
obtain obfuscated and encrypted output features, comprising homomorphically adding first obfuscation to the encrypted facial image;
obtain obfuscated and encrypted facial features, comprising homomorphically adding second obfuscation to the encrypted facial features;
transmitting the obfuscated and encrypted output features and the obfuscated and encrypted facial features to the end-user device;
receiving from the end-user device a difference between a second intermediate value and a first intermediate value, wherein the difference is calculated by the end-user device based on:
decrypting the obfuscated and encrypted facial features by using a first private key corresponding to the first public key to obtain the first intermediate value, and
decrypting the obfuscated and encrypted output features by using a second private key corresponding to the second public key to obtain the second intermediate value; and determining whether the to-be-recognized facial image corresponds to a facial image of the target user, comprising removing an impact of the first obfuscation and the second obfuscation on the difference.

17. The computer-implemented system according to claim 16, wherein the operations further comprise:
receiving an encrypted and registered facial image and the first public key from the end-user device, wherein the encrypted and registered facial image is obtained by performing homomorphic encryption on at least one registered facial image that is collected by the end-user device by using the first public key; and
performing homomorphic feature processing on the encrypted and registered facial image to obtain the encrypted facial features of the target user.

18. The computer-implemented system according to claim 16, wherein the recognition request further comprises a user identifier of the target user, and the operations further comprise:
obtaining the encrypted facial features of the target user from pre-stored encrypted facial features of a plurality of users based on the user identifier of the target user.

19. The computer-implemented system according to claim 16, wherein the homomorphic feature processing comprises:
performing feature processing by using a facial recognition model suitable for a homomorphic operation.

20. The computer-implemented system according to claim 16, wherein the performing the homomorphic feature processing on the encrypted facial image and homomorphically adding the first obfuscation to the encrypted facial image comprises:
performing homomorphic feature processing on the encrypted facial image to obtain encrypted output features; and
adding first encrypted random features to the encrypted output features to obtain the obfuscated and encrypted output features, wherein the first encrypted random features are obtained by performing homomorphic encryption on first initial random features by using the second public key.

* * * * *

UNITED STATES PATENT AND TRADEMARK OFFICE
CERTIFICATE OF CORRECTION

| | |
|---|---|
| PATENT NO. | : 11,256,900 B1 |
| APPLICATION NO. | : 17/360462 |
| DATED | : February 22, 2022 |
| INVENTOR(S) | : Zheng et al. |

It is certified that error appears in the above-identified patent and that said Letters Patent is hereby corrected as shown below:

In the Claims

Column 15, Line 2, in Claim 9, delete "instructions, executable" and insert -- instructions, that when executed --.

Signed and Sealed this
Third Day of May, 2022

Katherine Kelly Vidal
*Director of the United States Patent and Trademark Office*